INVENTORS
Heinz Harnisch
Waldemar Bielenberg
Franz Rodis

# United States Patent Office 3,148,042
Patented Sept. 8, 1964

3,148,042
GAS-LIQUID CONTACT SYSTEM FOR SEPA-
RATING PHOSPHORUS FROM GASES
Heinz Harnisch and Waldemar Bielenberg, both of
Cologne-Klettenberg, and Franz Rodis, Knapsack, near
Cologne, Germany, assignors to Knapsack-Griesheim
Aktiengesellschaft, Knapsack, near Cologne, Germany,
a corporation of Germany
Filed Aug. 8, 1960, Ser. No. 48,280
4 Claims. (Cl. 55—229)

This is a continuation-in-part application of our application Serial No. 769,763, filed on October 27, 1958, and now abandoned.

The present invention relates to an apparatus for separating phophorus from gases containing phosphorus in a substantially vaporous state, and more particularly from gases escaping from a phosphorus reduction furnace, by cooling and condensation with water.

It is known to cool gases escaping from phosphorus reduction furnaces by spraying with water in a condenser operating at a temperature above the melting point of phosphorus, whereby the vaporous phosphorus contained in the escaping gases is for the most part condensed, and to burn off the gases which escape from the condenser at a temperature above about $+55$ to $+65°$ C. and which still contain a small amount of phosphorus. The losses arising in this process are considerable according to the vapor pressure curve of phosphorus.

In U.S. Patent 2,050,797, the recovery of the remaining valuable phosphorus by conducting the condensation in three stages is described, wherein the water circuits for the second and third condensers are supplied from a common supply line. In the first condenser which operates at a temperature above the melting point of phosphorus, cooling is effected by water spraying. In the second condenser which also operates at a temperature above the melting point of phosphorus, the gases are further cooled by means of water conducted in a circuit over a cooling device. The third condenser operates at a temperature below the melting point of phosphorus, the gas being cooled in the same manner as in the second condensation stage.

In these known processes, the gas containing phosphorus vapors is introduced into the third, i.e., the last condensation stage at a temperature of about $+45°$ C., that is to say at a temperature only a little above the melting point of phosphorus ($+44°$ C.). The phosphorus so obtained can be melted only with difficulty since the phosphorus separated from such a diluted mixture of gas and vapor contains a relatively large amount of oxide films which prevent the phosphorus from forming a uniform mass when it is heated to a temperature above the melting point. According to U.S. Patent 2,050,797 mentioned above, the phosphorus which has been separated in the form of sludge is therefore removed from the sump of the tower of the third condensation stage by a sludge pump without previous melting. To recover the phosphorus contained in the pumped-off sludge, the latter is combined with a greater amount of molten phosphorus, for example with the sump products of the tower of the first or second condensation stage. Pumping-off the phosphorus sludge from the third stage presents great difficulties. A fairly concentrated sludge causes clogging of the conduits, whereas when a diluted sludge is pumped off, a large amount of water is taken away from the water circuit of the cold condenser of the third stage and has to be continuously replaced by fresh water so that the advantages offered by a closed circuit of cooling agent, for example economization of cold water, avoidance of waste water and the use of water containing no oxygen, are to a high extent offset.

The present invention provides an apparatus which enables the aforesaid disadvantages to be overcome. The apparatus of this invention for separating phosphorus from gases containing phosphorus in a substantially vaporous state especially from gases escaping from a phosphorus reduction furnace, by cooling with water is carried out as follows: in the first condensation stage (heat-condensation stage) which operates at a temperature above the melting point of phosphorus, the escaping gas is precooled in a known manner by evaporation of recycled water to temperatures which are still considerably above the melting point of phosphorus, preferably at a temperature ranging from about $+55$ to about $+65°$ C., whereby the main portion of phosphorus is separated. The gas is then introduced into the lower part of a second condensation stage (cold-condensation stage) at a position slightly above the sump operating at a temperature below the melting point of phosphorus. In this second stage large quantities of cold water are cycled and finely atomized by spraying nozzles, the atomization being carried out in a space extending over about the entire height of the condensing tower or at least in the lower or middle section of the condensing tower, for example in several superjacent zones, so that the gas which still contains phosphorus is chilled already at a point just above the place where it enters the second condensation stage. By this process a suspension consisting of solid phosphorus and cooling water is formed while the gas which leaves the second stage at the top of the condensing tower entrains but relatively small amounts of phosphorus.

In the heat-condensation stage about 90% to about 99.5%, generally about 95% to about 99.5% of the phosphorus contained in the escaping gases is separated, while the remaining phosphorus is separated in the following second cold condensation stage of the invention.

The cold water introduced into the individual atomization zones may have the same initial temperature in each zone.

According to a further concept of the present invention, the lower part of the second condensation stage containing a suspension of solid phosphorus and cooling water as a sump is connected with a melting stage for phosphorus, the flowing in of the said suspension to the melting stage may be interrupted after the latter is filled. The phosphorus is then melted by direct supply of steam while mixing thoroughly. The liquid phosphorus is removed from the melting stage and then the connection with the second condensation stage is restored. The amount of the aforesaid suspension in the melting stage are chosen in a manner such that the heating period is fairly short and the interval or filling up period is fairly long.

The cooling water flowing over from the lower part of the second condensation stage is advantageously cooled to a temperature below about $+15°$ C., preferably to a temperature of about $+5$ to about $+10°$ C., and recycled to the second condensation stage in order to be atomized as cooling agent, the consumed portion of the water being replaced by fresh water. The gas escaping at the head of the second condensation stage is passed through a conduit which is preferably inclined while cooling water is injected and leaves via a centrifuging and collecting device while the material sinking to the bottom of said device travels from there into the sump of the second condensation stage.

The apparatus of this invention is novel in that the lower end of the second condensation stage has the shape of a funnel having a very acute aperture angle and in that an appropriate shut-off device, for example an insulated rotary disk which is disposed in a wide connecting piece, is provided between the lower end of the second condensing tower and the collecting vessel of the melting stage which is disposed beneath said lower end of the condensing tower and serves for collecting and melting the phosphorus. It should furthermore be stressed that a steam jet refrigerating plant is installed in the circuit of the cooling water of the second condensing tower. The gas delivery pipe at the top of the second condensation tower is inclined. A nozzle for injecting cooling water into said pipe faces the end of the pipe that is connected with the cooling tower, while the other end of the pipe projects into a centrifuging device, for example a blower, which may be followed by a droplet separator. The first condensing tower resembles in its construction the second condensing tower, however, the lower part of the first tower possesses a cylindrical shape.

According to the apparatus of this invention, the second condensation stage already operates at a temperature below the melting point of phosphorus. The apparatus of this invention is distinguished from the known apparatuses especially by this second stage in which the above mentioned difficulties arising in the process according to the aforesaid U.S. Patent are overcome in the first place by introducing the escaping gases at a higher temperature, preferably at +55 to +65° C. into the cold condenser of the second stage. Since the steam pressure is much higher at these temperatures, the quantities of phosphorus which are introduced into the cold condenser and separated there in the solid state are considerably larger than in the known apparatuses. When proceeding according to the apparatus of this invention, the separated phosphorus accumulating in the collecting vessel of the sump of the condensation can be melted in said collecting vessel and siphoned off in the liquid state since a sufficiently large quantity of liquid phosphorus is formed during the melting process, which liquid phosphorus, on being thoroughly mixed, for example by the direct introduction of the steam during the heating, absorbs the phosphorus that may be inclosed in films of oxide. The collecting vessel is heated periodically and the liquid phosphorus is removed or siphoned off periodically. By introducing a strong current of steam into the collecting vessel the heating periods can be kept fairly short and may last, for example, 2 to 3 hours, while the dimensions of the collecting vessel are chosen in a manner such that the intervals between the heating periods are fairly long and may last for example several days during which phosphorus sludge accumulates in the collecting vessel.

During the melting process the phosphorus and the water accumulated in the collecting vessel are shut off from the circuit of cooling water of the condenser by an appropriate shut-off device, otherwise uneconomical losses of heat and cold would arise. The annoying properties of the phosphorus separated in the cold condenser render it difficult to find a suitable shape for the sump of the cooling tower, which sump is to be constructed so that it can be divided into two superjacent chambers separated from one another by an appropriate shut-off device. Even tubes having a large diameter become clogged after some time owing to the formation of bridges and deposits of phosphorus form at the valves so that already after a short time the latter can no longer be operated. The phosphorus even deposits on relatively steep walls. In the apparatus of the invention the lower part of the cooling tower is therefore constructed in a manner that it forms a funnel which opens with a very acute aperture angle into the very wide connecting piece which has a diameter of about 30 to 50 cm. The connection piece connects the lower part of the condensing tower with the melting stage which may be of any desired shape and serves as a collecting vessel for the separated phosphorus. During the melting process, the collecting vessel is separated from the upper funnel-shaped part of the second condensation stage by an insulated rotary disc disposed in the connecting piece whereby undesired heat transmission by convection and diffusion is substantially avoided.

Another important difference between the apparatus of the aforesaid U.S. patent and the apparatus of the present invention consists in the fact that, according to said patent, the cooling water is also introduced into the third stage only at the head of the condensing tower in the form of a coarse rain, whereas according to the present invention the cooling water is distributed over the entire height of the tower and introduced in the form of very fine droplets of water through spraying nozzles. If in the known process in which the cooling agent is introduced only at one place, i.e., at the head of the tower, an escaping gas the temperature of which is considerably above the melting point of phosphorus were introduced at the bottom of the tower, the gas would be cooled to a temperature below the melting point of phosphorus only in about the middle section of the tower, which would be disadvantageous. Still liquid droplets of phosphorus would reach the wall of the lower part of the condensing tower, solidify there and form undesired deposits which can only be removed by melting after the operation of the plant has been stopped, which causes uneconomical losses of heat and cold.

The apparatus of the invention enables the aforesaid disadvantages to be avoided by chilling the gas directly after or a short time after its entry into the second cooling tower to a temperature below the melting point of phosphorus by means of large quantities of very cold water which is injected through nozzles into at least the lower and middle part of the tower; any deposits at the walls of the tower are thus prevented. By the use of nozzles which atomize the water so that extremely fine droplets are obtained a considerably better heat exchange is obtained than with the known method using a coarse rain. When proceeding according to the apparatus of the invention, it is, for example, possible to cool the gas to such an extent that it escapes at the head of the cooling tower at a temperature which is only 3 to 5° C. above the temperature of the injected cooling water, whereas according to the apparatus of the aforesaid U.S. patent the temperature of the leaving gas is about 15 to 20° C. above the temperature of the cooling water. Hence the apparatus of the invention enables a considerably colder gas which consequently contains a smaller amount of phosphorus vapor to be obtained with the same temperature of the cooling agent.

The use of nozzles at fiirst involved several difficulties since, in contradistinction to the method using a coarse rain, part of the phosphorus condenses in the form of extremely fine particles which are entrained by the gas leaving the condenser and thus removed from the condenser. A suitable method of separating these particles which deposited in the conduits after the tower and after some time caused clogging could be found. This method consists in passing the gas through an inclined conduit extending laterally out of the head of the second condensing tower and introducing it into a centrifuging device, for example a blower. Said inclined conduit advantageously consists of a short pipe having a fairly smooth inside wall. Water is injected into the end of the pipe which is connected to the tower, whereby, on the one hand, clogging of the pipe is prevented and, on the other hand, the separation in the centrifuging device or blower is facilitated. A droplet separator is connected in series with the centrifuging device or blower. The material flowing off at the bottom of the centrifuging device or blower as well as the material flowing off at the bottom of the separator are conducted into the sump of the cooling tower. It is to be avoided that the gas leaving the droplet separator causes any deposits of phosphorus in the following network of conduits, that is to say the gas should be transportable. The gas treated according to the invention fulfills this requirement, since it has been cooled in the cooling tower to a temperature below the normal external temperature whereby the phosphorus vapors are condensed to a great extent so that the gas is obtained in a very pure state and no subsequent after-condensation occurs in the outlet pipes. In this manner any disturbance is prevented and the traces of phosphorus vapors still entrained cannot be considered as losses.

Figure 1:
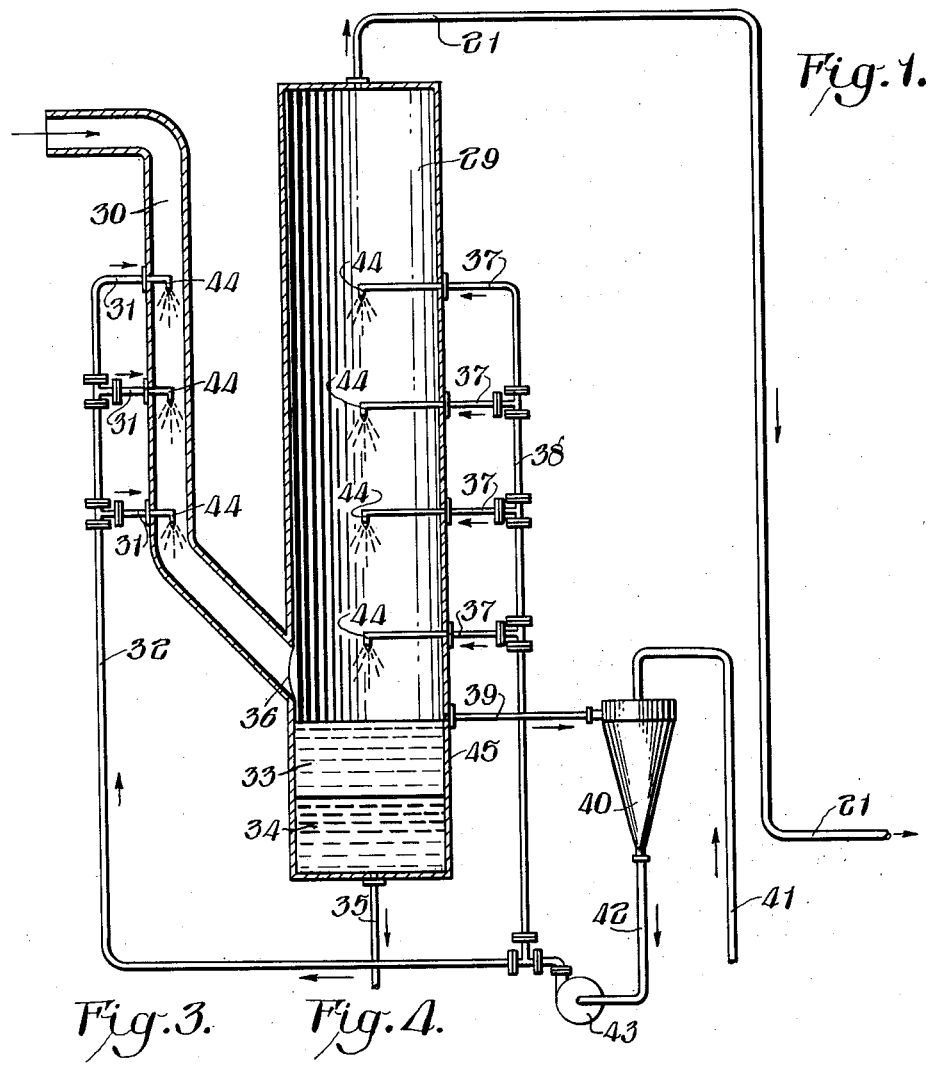
FIG. 1 is a view partially in section of the first condensation stage of the present apparatus.

In the apparatus shown in FIG. 1, the hot gases escaping from the furnace during the production of phosphorus (not shown) which gases contain phosphorus in vaporous form are passed through conduit 30 and opening 36 to the bottom part of the cooling tower 29. For the condensation of the main amount of the phosphorus in gas form, the gases pass in direct current in conduit 30 and pass counter currently in the cooling tower 29, are sprayed with an atomized water spray from the nozzles 44 whereby the condensed phosphorus 34 is taken up by the cooling water 33 in reservoir 45. The nozzles 44 are supplied with cooling water by way of the secondary conduits 31 and 37 which branch off from the main conduits 32 and 38. The flowing off cooling water is brought to the main conduits 32 and 38 from the overflow vessel 40 by a conduit 42 with the aid of a pump 43. The overflow vessel 40 is connected with the cooling water reservoir 45 by the overflow conduit 39. The cooling water which evaporates during the condensation of phosphorus is replenished by fresh water introduced through conduit 41 into the oxerflow vessel 40. The phosphorus 34 collected in fluid form in the reservoir 45 after condensation can be discharged through conduit 35 on the bottom of the container. The uncondensed parts of the gas flowing through the cooling tower 29 leave the latter by way of conduit 21 and are brought into the following cooling tower 2 of FIG. 2.

Figure 2:
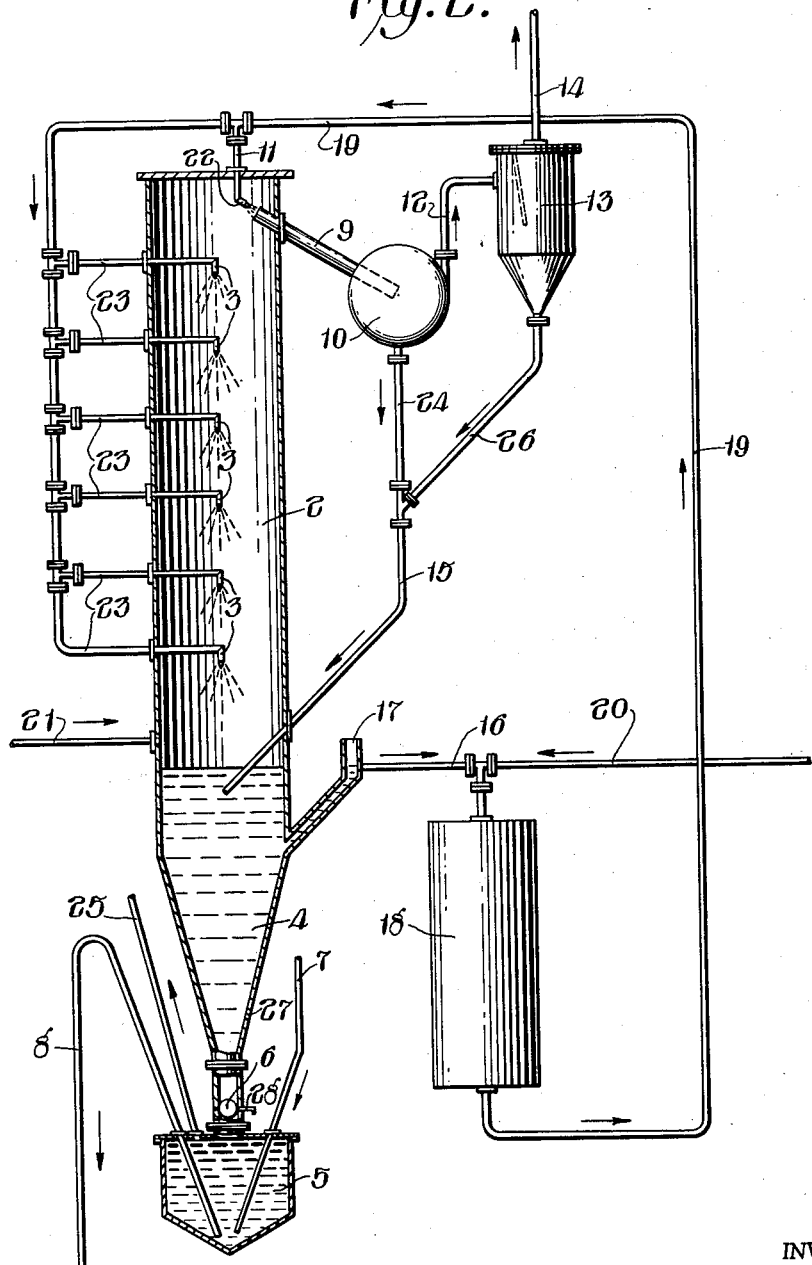
FIG. 2 is a view partially in section of the second condensation stage of the apparatus.

From the circuit of cooling water 19, water is diverted and passed through conduits 11 and 23 to be sprayed through nozzle tips 3 and 22 as seen in FIG. 2. Said nozzle tips are directed downwards so that the escaping gas flows upwards in countercurent to the atomized jet and leaves the cooling tower 2 at the head of the latter through inclined gas delivery pipe 9. The end of gas delivery pipe 9 that is connected with the tower is charged with water by nozzle tip 22 so that the pipe is continuously rinsed with water.

The condensed phosphorus and cooling water flow into the lower end 4 of the tower from where the phosphorus sump sinks thorugh the wide conduit 27 via the open shut-off device 6 into collecting vessel 5 in which the phosphorus is melted from time to time after conduit 27 has been closed by a turntable shut-off device 6.

Figures 3, 4:
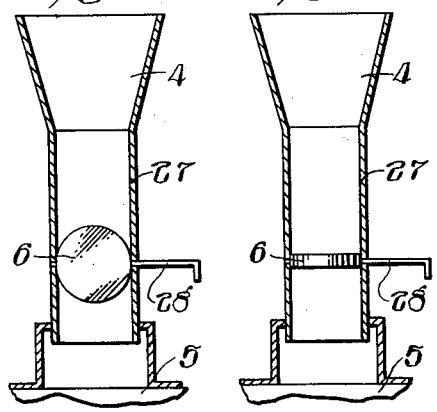
FIGS. 3 and 4 are details of enlarged scale of a portion of the apparatus shown in FIG. 2.

FIGS. 3 and 4 show the turntable shut-off device 6 in vertical and horizontal positions, the turntable being the shutting device in the drainage tube 27. The turning of the disc is acomplished by lever 28.

The phosphorus is melted, while being thoroughly mixed, by means of steam introduced through inlet pipe 7. Conduit 25 is used for deaeration. Outlet pipe 8 serves for siphoning-off the molten phosphorus.

The cooling water flows from the sump through overflow pipe 16 provided with deaeration means 17 and is returned via steam jet refrigerating plant 18 into the circuit of cooling water 19. The consumed water of the latter is replaced by fresh water introduced through inlet pipe 20.

The gas leaving the head of cooling tower 2 flows into centrifuging device 10 which, for example, may be a blower, and travels through conduit 12 into droplet separator 13 from which it escapes through outlet pipe 14 provided at the head of said separator. The water and fine dust of phosphorus delivered through conduits 24 and 26 of centrifuging device 10 and separator 13 are collected in conduit 15 and introduced into the sump of cooling tower 2. The following Examples serve to illustrate the invention but are not intended to limit it thereto.

*Example 1*

10,000 cubic meters of an escaping gas from a phosphorus reduction furnace which was saturated with steam and had a temperature of +60° C. were conducted at a rate of 1000 m.³ per hour from the first condensation stage through conduit 21 into the lower part of the cooling tower 2 of the second condensation stage. While moving upwards in the cooling tower 2, the gas was cooled to +10° C. by means of water at +5° C. injected through nozzles 3. During this procedure, 33.4 kg. of the 34 kg. of vaporous phosphorus contained in the escaping gas were condensed. Of the condensed phosphorus, about 33 kg. accumulated together with the injected water in the funnel-shaped lower end 4 of the cooling tower. Owing to its greater specific gravity, the phosphorus sank from the lower end 4 into the collecting vessel 5 through the very wide conduit 27 provided with a shut-off device 6. After the shut-off device 6 had been closed, the phosphorus contained in the collecting vessel was melted within a fairly short time by means of steam which was directly introduced through inlet pipe 7. Deaeration was effected through conduit 25. The liquid phosphorus was then siphoned off through outlet pipe 8.

The cooled gas which entrained about 0.4 kg. of fine dust of condensed small particles of phosphorus in addition to 0.6 kg. of still vaporous phosphorus left the head of the cooling tower 2 and flowed through the inclined gas delivery pipe 9 into the centrifuging device. The end of delivery pipe 9 connected with the tower was rinsed with water sprayed through the inclined nozzle 22. After having been freed from entrained fine dust of phosphorus in the centrifuging device 10, the gas was passed through conduit 12 into a droplet separator 13 in order to be freed from droplets of water. The gas left the droplet separator 13 by way of outlet pipe 14. The water which had been separated from the gas by centrifuging device 10 and droplet separator 13 flowed together with the fine dust of phosphorus which had also been separated through conduits 24 and 26 and collecting pipe 15 into the lower end 4 of the cooling tower 2 where it was combined with the sump of the cooling tower 2.

In consequence of the cooling of the gas, the temperature of the water accumulating in the sump rose from initially +5° C. to about +30° C. The water was conducted as overflow of lower end 4 of the tower through overflow pipe 16 provided with a deaeration means 17 into the steam jet refrigerating plant 18 where it was recooled to +5° C. and then reintroduced at this temperature in a cycle into the cooling tower 2. Since the quantity of water evaporating during the recooling in refrigerating plant 18 was somewhat larger than that condensed in the cooling tower 2 during the cooling of the hot gas, a corresponding quantity of fresh water had to be introduced into the circuit of cooling water through inlet pipe 20.

*Example 2*

15,000 cubic meters of an escaping gas of +55° C. which was saturated with steam and contained 36.5 kg. of vaporous phosphorus were purified by condensation as described in Example 1. A total of 35.7 kg. of phosphorus was separated in the solid state in the cooling tower 2 and the centrifuging device 10, collected in the lower end 4 of the cooling tower, allowed to sink into the collecting vessel 5 as described above, melted and siphoned off.

The final temperature of the purified gas was +10° C. At this temperature the gas still contained about 0.8 kg. of vaporous phosphorus.

We claim:

1. An apparatus for separating phosphorus from gases which comprises a condensing tower containing superjacent spray means for a first condensation stage, a second condensing tower connected with the first tower for a second condensation stage, the lower end of the latter having the shape of a funnel provided with an acute angle, means for introducing gas containing phosphorus into said towers in series, a collecting vessel connected with the lower end of said second tower, a shut-off device being disposed between the lower end of the second tower and the collecting vessel, means for introducing steam into the collecting vessel for melting the phosphorus collected therein, an inclined gas discharge pipe disposed at the top of the second condensing tower, spray nozzle means for injecting cooling water facing the end of said pipe that opens into the condensing tower while the other end of said pipe projects into a centrifuging device located externally of the second tower which centrifuging device is connected in series with a droplet separator, and means for returning liquid separated in the centrifuging device and the droplet separator into the second condensing tower.

2. An apparatus according to claim 1 wherein the shut-off device is an insulated rotary disc disposed in a connecting piece.

3. An apparatus according to claim 1 wherein the centrifuging device is a blower.

4. An apparatus according to claim 1 wherein a circuit of water is connected with the second condensation stage, and a steam jet refrigerating plant is connected in said circuit to cool said circuit of water.

References Cited in the file of this patent

UNITED STATES PATENTS

| | | |
|---|---|---|
| 1,104,717 | Topf | July 21, 1914 |
| 1,169,764 | Brassert | Feb. 1, 1916 |
| 2,050,797 | Kerschbaum | Aug. 11, 1936 |
| 2,135,486 | Almond | Nov. 8, 1938 |
| 2,140,306 | Beals | Dec. 13, 1948 |
| 2,234,385 | Ryner | Mar. 11, 1941 |
| 2,315,226 | Rohlin | Mar. 30, 1943 |
| 2,621,492 | Beardsley et al. | Dec. 16, 1952 |
| 2,747,847 | Otto | May 29, 1956 |